US012596051B2

(12) United States Patent
Cook

(10) Patent No.: US 12,596,051 B2
(45) Date of Patent: Apr. 7, 2026

(54) AUTO TEST CIRCUIT USING AN INTENSIFIER

(71) Applicant: FMC Technologies, Inc., Houston, TX (US)

(72) Inventor: James Cook, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 486 days.

(21) Appl. No.: 18/156,715

(22) Filed: Jan. 19, 2023

(65) Prior Publication Data

US 2024/0247997 A1 Jul. 25, 2024

(51) Int. Cl.
*G01M 3/28* (2006.01)
*F16L 37/62* (2006.01)
*F16L 41/00* (2006.01)
*E21B 33/03* (2006.01)

(52) U.S. Cl.
CPC ........... *G01M 3/2853* (2013.01); *F16L 37/62* (2013.01); *F16L 41/008* (2013.01); *E21B 33/03* (2013.01)

(58) Field of Classification Search
CPC ..... G01M 3/2853; F16L 37/62; F16L 41/008; E21B 33/03
See application file for complete search history.

(56) References Cited

U.S. PATENT DOCUMENTS

| | | | |
|---|---|---|---|
| 2016/0033352 A1* | 2/2016 | Adolfse | ............... G01L 27/005 |
| | | | 73/1.57 |
| 2021/0062617 A1* | 3/2021 | Pillai | ..................... E21B 47/117 |

* cited by examiner

*Primary Examiner* — David Z Huang
(74) *Attorney, Agent, or Firm* — Osha Bergman Watanabe & Burton LLP

(57) ABSTRACT

A method includes providing a hydraulic connector having a hydraulic lock, wherein the hydraulic lock is operated using a hydraulic supply line and a hydraulic outlet line, and connecting the hydraulic connector to a component by activating the hydraulic lock. While the hydraulic lock is activated, a connection between the hydraulic connector and the component is pressure tested by directing a portion of the hydraulic fluid from the hydraulic supply line to a pressure testing system, using an intensifier in the pressure testing system to pressurize the portion of hydraulic fluid to a testing pressure, and directing the pressurized portion of hydraulic fluid to the connection to test a pressure rating of the connection.

10 Claims, 11 Drawing Sheets

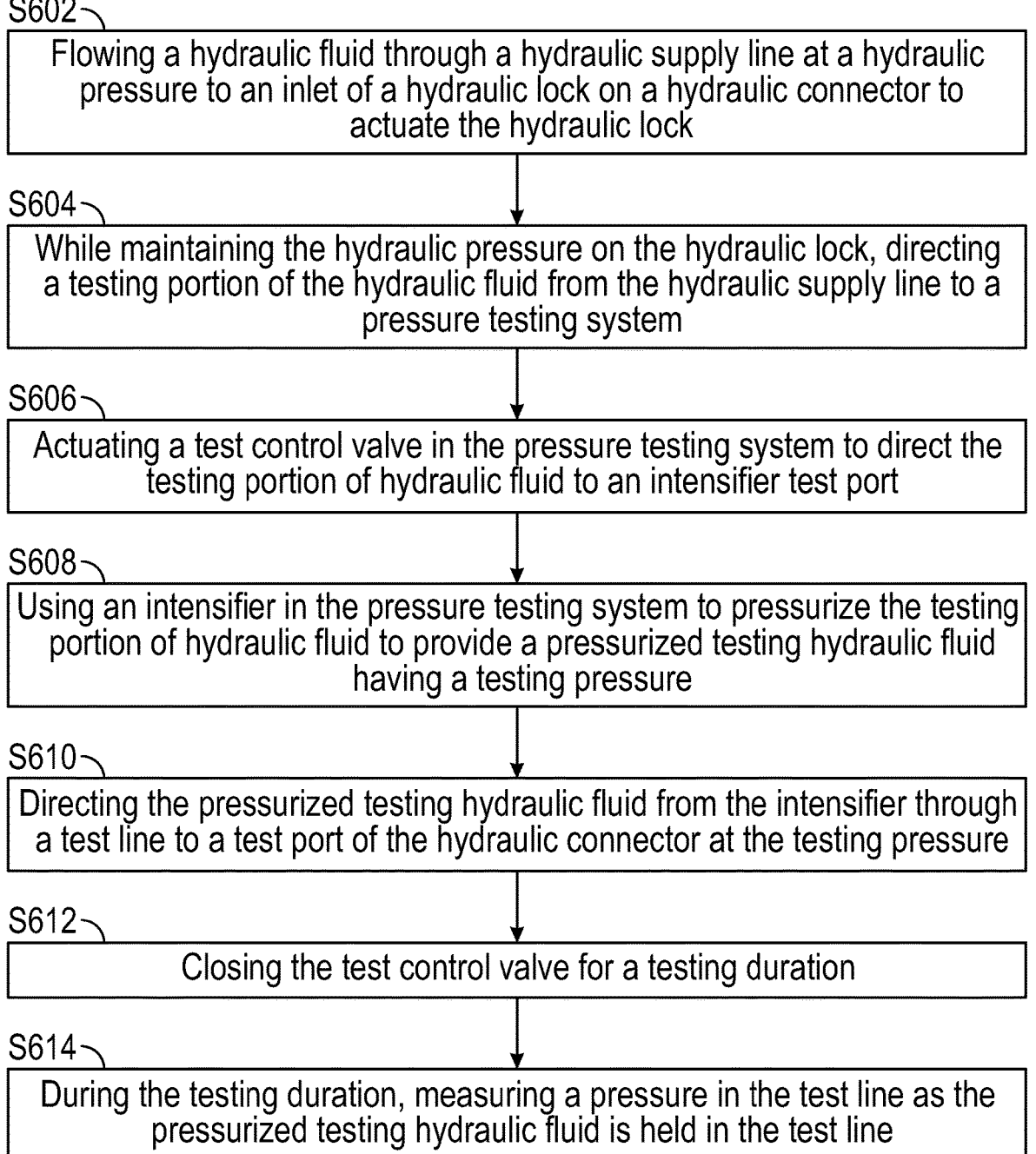

S602

Flowing a hydraulic fluid through a hydraulic supply line at a hydraulic pressure to an inlet of a hydraulic lock on a hydraulic connector to actuate the hydraulic lock

S604

While maintaining the hydraulic pressure on the hydraulic lock, directing a testing portion of the hydraulic fluid from the hydraulic supply line to a pressure testing system

S606

Actuating a test control valve in the pressure testing system to direct the testing portion of hydraulic fluid to an intensifier test port

S608

Using an intensifier in the pressure testing system to pressurize the testing portion of hydraulic fluid to provide a pressurized testing hydraulic fluid having a testing pressure

S610

Directing the pressurized testing hydraulic fluid from the intensifier through a test line to a test port of the hydraulic connector at the testing pressure

S612

Closing the test control valve for a testing duration

S614

During the testing duration, measuring a pressure in the test line as the pressurized testing hydraulic fluid is held in the test line

FIG. 6

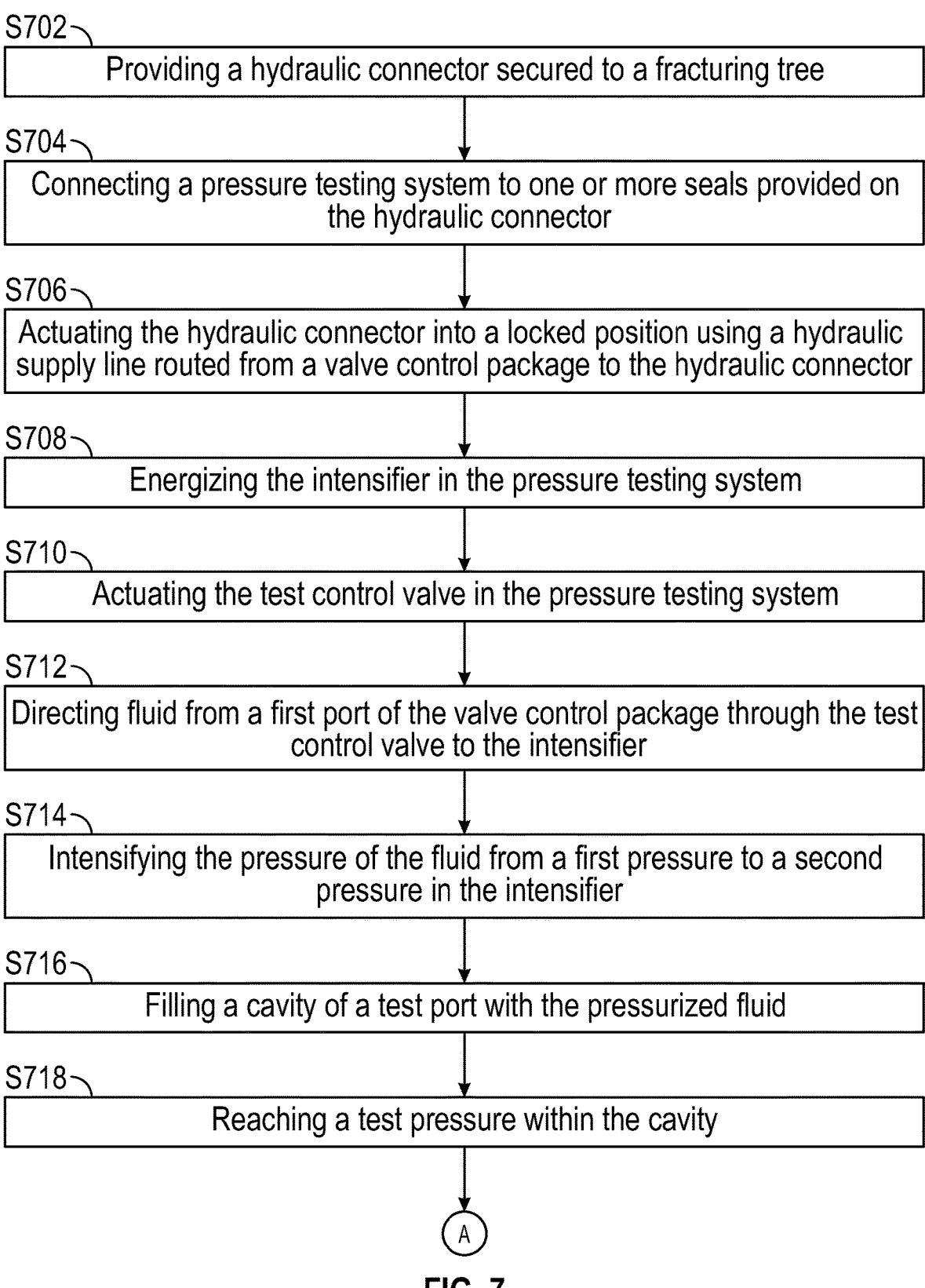

S702

Providing a hydraulic connector secured to a fracturing tree

S704

Connecting a pressure testing system to one or more seals provided on the hydraulic connector

S706

Actuating the hydraulic connector into a locked position using a hydraulic supply line routed from a valve control package to the hydraulic connector

S708

Energizing the intensifier in the pressure testing system

S710

Actuating the test control valve in the pressure testing system

S712

Directing fluid from a first port of the valve control package through the test control valve to the intensifier

S714

Intensifying the pressure of the fluid from a first pressure to a second pressure in the intensifier

S716

Filling a cavity of a test port with the pressurized fluid

S718

Reaching a test pressure within the cavity (A)

FIG. 7

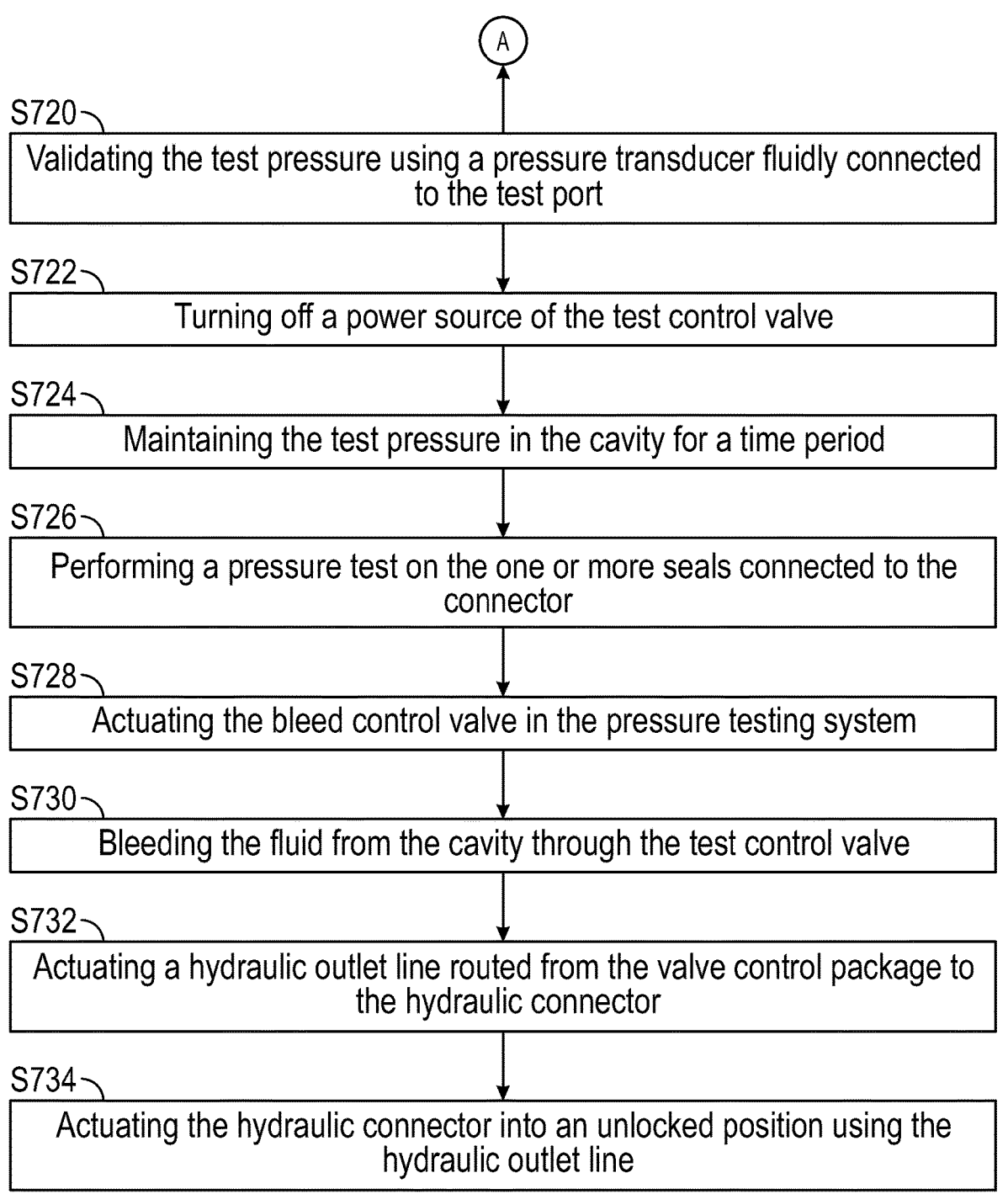

S720 — Validating the test pressure using a pressure transducer fluidly connected to the test port S722 — Turning off a power source of the test control valve S724 — Maintaining the test pressure in the cavity for a time period S726 — Performing a pressure test on the one or more seals connected to the connector S728 — Actuating the bleed control valve in the pressure testing system S730 — Bleeding the fluid from the cavity through the test control valve S732 — Actuating a hydraulic outlet line routed from the valve control package to the hydraulic connector S734 — Actuating the hydraulic connector into an unlocked position using the hydraulic outlet line

FIG. 7
(Continued)

AUTO TEST CIRCUIT USING AN INTENSIFIER

BACKGROUND

Hydraulic connectors use hydraulic fluid to hydraulically lock the connector to the equipment being connected. Hydraulic connectors are commonly used in the oil and gas industry, for example, on subsea equipment or hydraulic fracturing equipment. Wireline connectors may refer to hydraulic connectors which are landed on top of fracturing trees and hydraulically locked onto wellheads. Each wireline connector may include one or more seals intended to maintain pressures within the connector. Instead of pressure testing the bore of the connector, an external seal test may be performed to pressure test between the one or more seals. If the area between the seals successfully maintains pressure, the entire connector can also be considered to have passed the safety test.

FIGS. 1A and 1B show a commercially available external seal test configuration. Specifically, FIG. 1A shows a connector and testing equipment and FIG. 1B shows a cutaway view of the connector and testing equipment. A manifold block 102 may be secured to a connector 100. The manifold block 102 may be fluidly connected to two hoses for operating a hydraulic lock 103 on the connector. As shown, a lock hose 106 delivering hydraulic fluid to the hydraulic lock 103 may be connected to a first inlet connection 104 on the manifold, and an unlock hose 108 (for return hydraulic fluid from the hydraulic lock) may be connected to a second inlet connection 104 on the manifold.

Additionally, the manifold block is fluidly connected to a test hose 110 for conducting the external seal test. The test hose 110 may be connected directly to the manifold block 102 via a test line inlet 112, shown in FIG. 1B. In order to conduct the seal test, the test hose 110 may be designed to carry higher pressure fluids than the lock and unlock hoses, e.g., the test hose may be rated for pressures up to 15,000 psi. A test line 114 may exit the manifold block 102 and may be routed internally through the connector 100 to one or more seals 116. The test line 114 may also be rated for higher pressures, e.g., up to 15,000 psi.

The test hose 110 may extend from the manifold block 102 to a remote testing location positioned outside of the redzone. The remote testing location may be, for example, several hundred feet away from the connector. A hand pump may be used to cycle the pressure up to 15,000 psi. The hand pump must be manually operated. Once the test has been completed and the seals 116 are confirmed to be successfully holding pressure, an operator may bleed off the hand pump and regular operations can continue. Such a procedure has inherent risks, such as running a high pressure line several hundred feet to the connector and requiring an operator close to the redzone, and is highly inefficient due to its lack of automation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods that include providing a hydraulic connector having a hydraulic lock, wherein the hydraulic lock is operated using a hydraulic supply line and a hydraulic outlet line, and connecting the hydraulic connector to a component by activating the hydraulic lock. While the hydraulic lock is activated, a connection between the hydraulic connector and the component is pressure tested by directing a portion of the hydraulic fluid from the hydraulic supply line to a pressure testing system, using an intensifier in the pressure testing system to pressurize the portion of hydraulic fluid to a testing pressure, and directing the pressurized portion of hydraulic fluid to the connection to test a pressure rating of the connection.

In another aspect, embodiments disclosed herein relate to methods of pressure testing that include flowing a hydraulic fluid through a hydraulic supply line at a hydraulic pressure to an inlet of a hydraulic lock on a hydraulic connector to actuate the hydraulic lock, and while maintaining the hydraulic pressure on the hydraulic lock, directing a testing portion of the hydraulic fluid from the hydraulic supply line to a pressure testing system. The pressure testing system may include an intensifier fluidly connected to a test port of the hydraulic connector and a test control valve operable to control fluid flow from the hydraulic supply line to the intensifier. The pressure testing methods may further include actuating the test control valve to direct the testing portion of hydraulic fluid to an intensifier test port, using the intensifier to pressurize the testing portion of hydraulic fluid at the hydraulic pressure to provide a pressurized testing hydraulic fluid having a testing pressure, directing the pressurized testing hydraulic fluid from the intensifier through a test line to the test port at the testing pressure, wherein the test port is in fluid communication with a connection surface of the hydraulic connector, closing the test control valve for a testing duration, and during the testing duration, measuring a pressure in the test line as the pressurized testing hydraulic fluid is held in the test line.

In yet another aspect, embodiments disclosed herein relate to a system that includes a hydraulic connector having at least one hydraulic lock, a hydraulic supply line and a hydraulic outlet line fluidly connected to the hydraulic lock, a test port in fluid communication with a connection surface of the hydraulic connector, an intensifier fluidly connected to the test port, a pressure transducer fluidly connected between the intensifier and the test port, and a manifold, wherein the manifold fluidly connects the intensifier to the hydraulic supply line and the hydraulic outlet line.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 6 shows a flowchart of a method in accordance with one or more embodiments.

FIG. 7 shows a flowchart of a method in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 2-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Embodiments disclosed herein relate to a pressure testing system configured to perform pressure testing procedures on a hydraulic connector. More specifically, embodiments disclosed herein relate to a pressure testing system fluidly connected to a hydraulic connector, where a portion of the hydraulic fluid used to operate the hydraulic connector is directed through an intensifier in the pressure testing system to perform the pressure testing. The pressure testing system may be automated, operated remotely, and/or manually operated. For example, in some embodiments, a pressure testing system may be automated and may have a manual override system in place in case manual intervention is needed. Additionally, the pressure testing system may be secured in its entirety to the hydraulic connector, positioned entirely outside of a redzone boundary (a designated area of potential hazard), or partially secured to the connector and partially positioned outside of the redzone boundary.

Figure 1A:
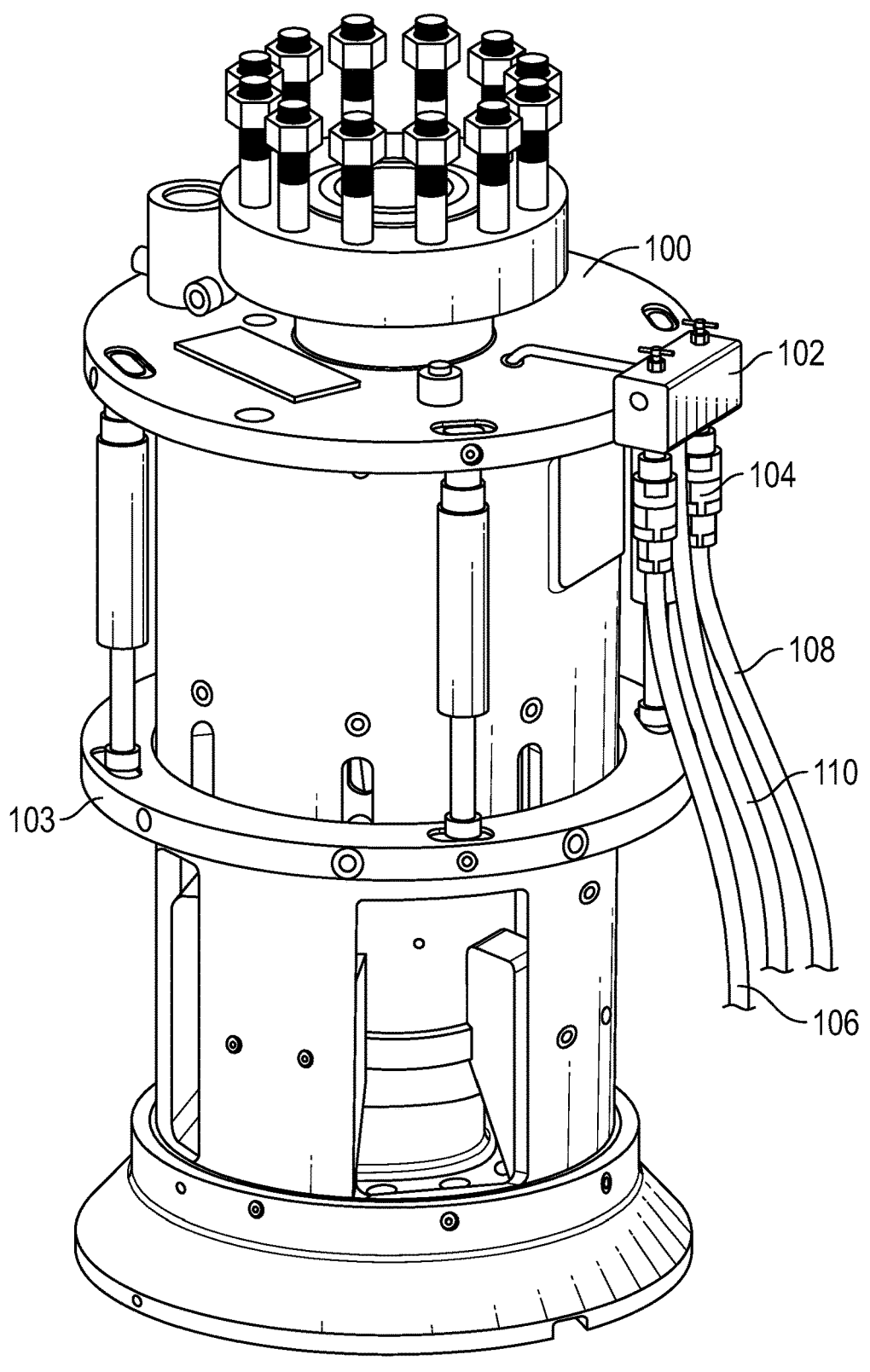
FIGS. 1A and 1B show a commercially available external seal test configuration.
Figure 1B:
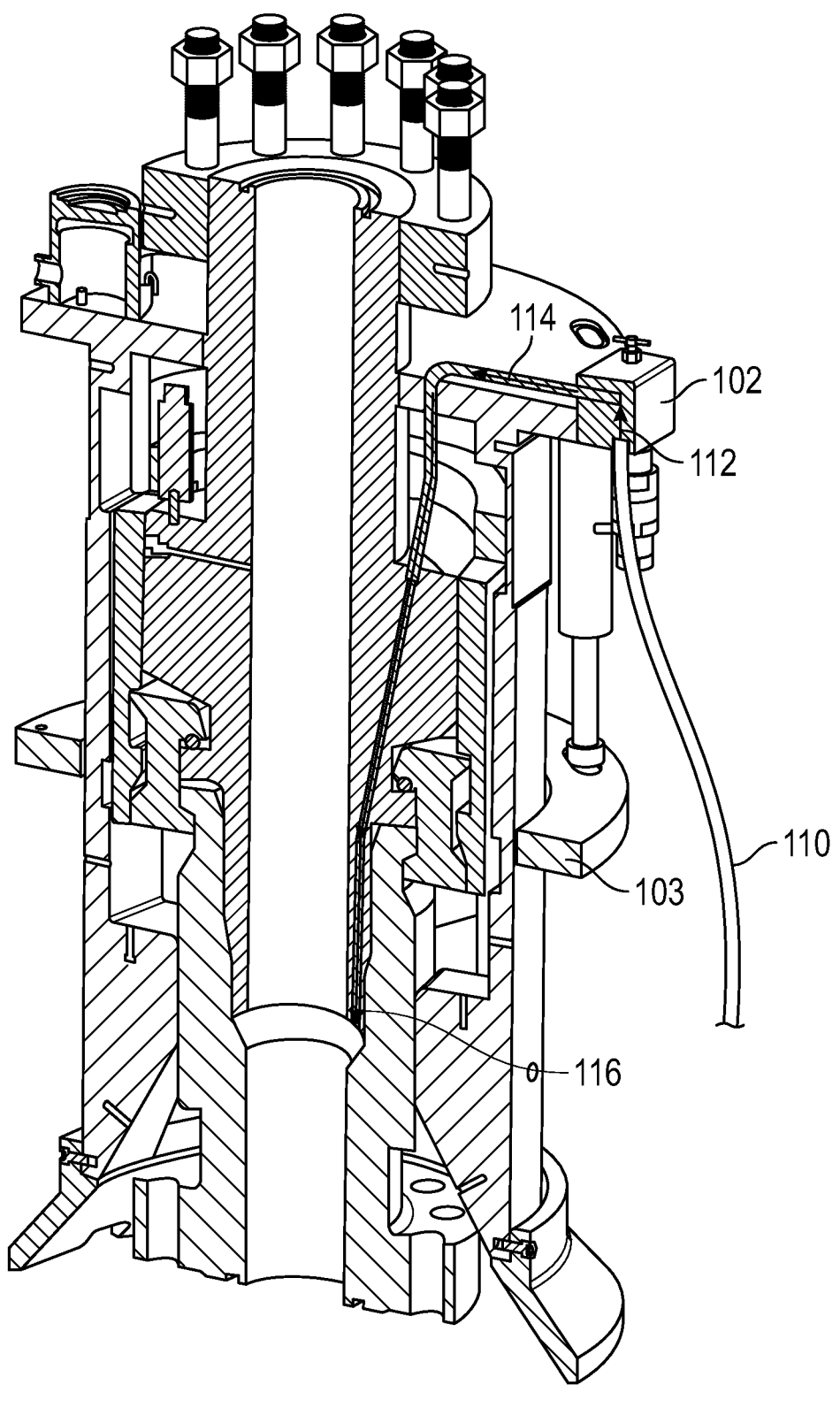
Figure 2A:
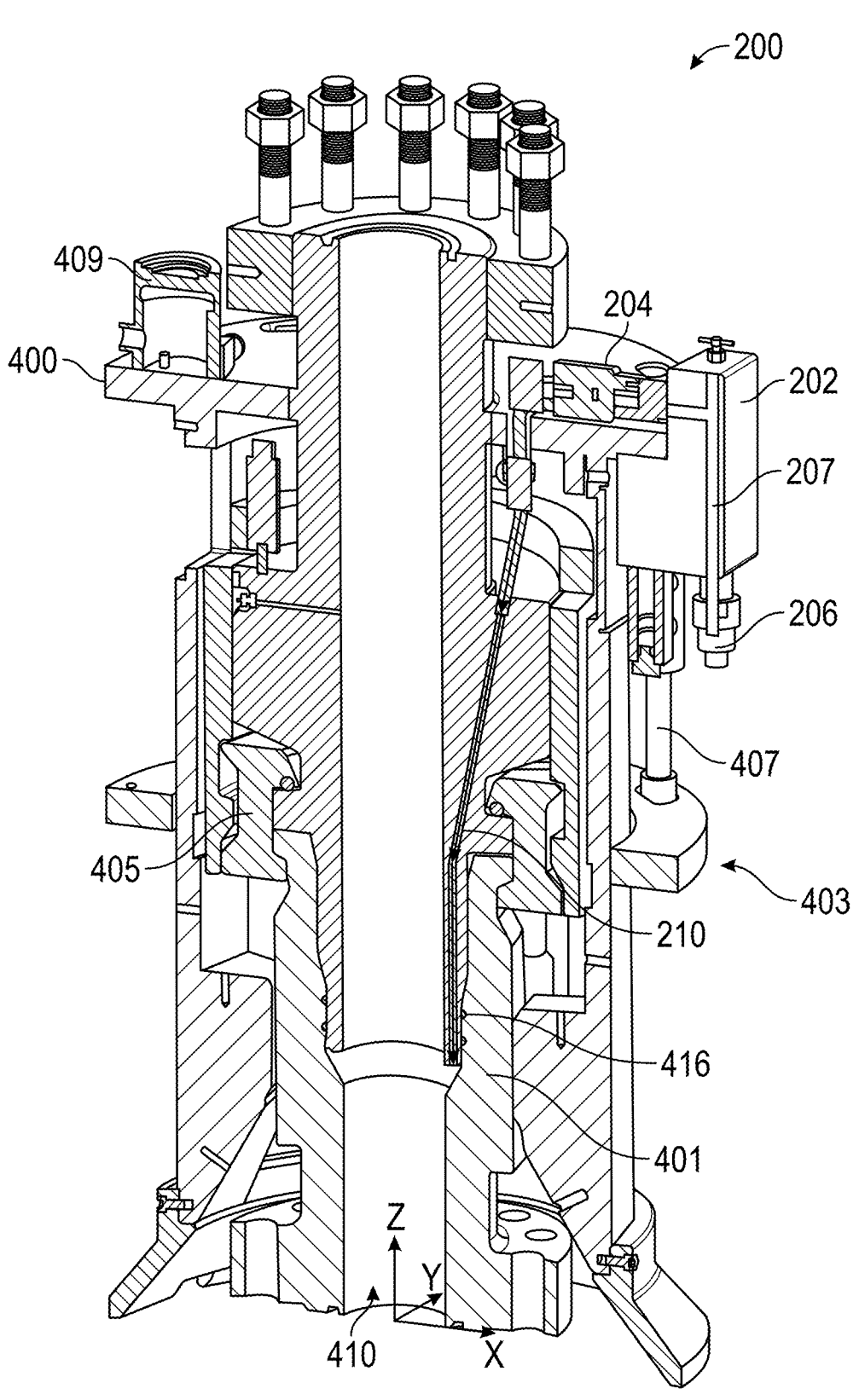
FIGS. 2A-2C show an automated testing system secured to a connector in accordance with one or more embodiments.
Figure 2B:
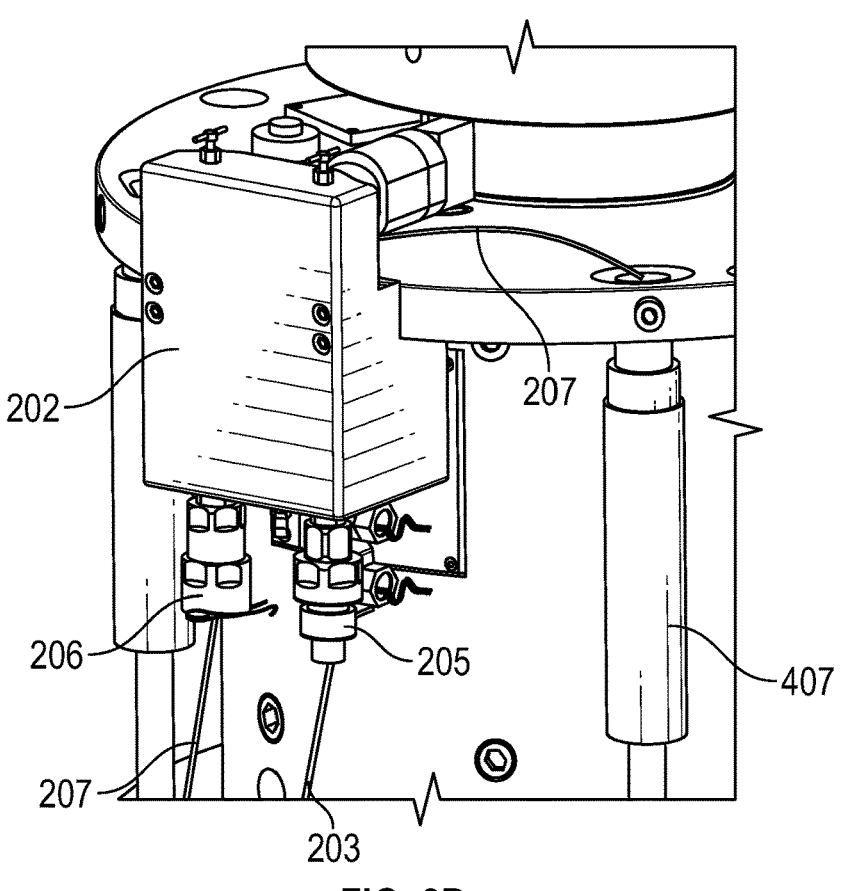
Figure 2C:
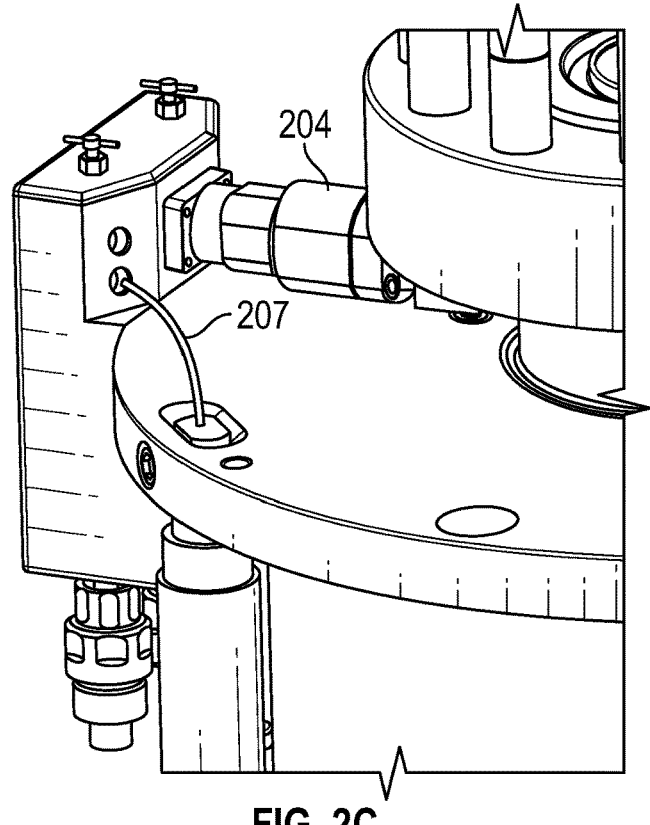

FIGS. 2A-2C show an example of a pressure testing system 200 according to embodiments of the present disclosure used with a wireline connector. However, the pressure testing system 200 may similarly be used with various other types of hydraulic connectors. FIG. 2A shows a cutaway view of a hydraulic connector 400 with an attached pressure testing system 200, and FIGS. 2B and 2C show detailed views of the pressure testing system 200 secured to the hydraulic connector 400.

The hydraulic connector 400 includes a hydraulic lock 403. In the embodiment shown, the hydraulic lock 403 includes a plurality of clamps 405 that may be moved between a lock and unlock positions using hydraulic pressure from a plurality of hydraulic pistons 407 to lock and unlock the connection between the hydraulic connector 400 and another component 401. To operate the hydraulic pistons, the hydraulic pistons 407 are supplied hydraulic fluid from a single hydraulic supply line 207 and hydraulic fluid is bled from the pistons via a single hydraulic outlet line 203. Depending on the hydraulic connector, a hydraulic connector may include one or more hydraulic locks, which may be hydraulically activated in different ways known in the art using hydraulic fluid (e.g., using one or more hydraulically activated piston).

In one or more embodiments, the pressure testing system 200 may include a manifold 202 and an intensifier 204. The manifold 202 may include an assembly of valves and flowlines configured to direct hydraulic fluid from the hydraulic supply line 207 to the intensifier 204. In some embodiments, such as shown in FIGS. 2A-C, a manifold may also include a manifold housing or frame which may be used to hold the manifold components. The intensifier 204 pressurizes the hydraulic fluid to provide a pressurized testing hydraulic fluid, which is used to pressure test the connection between the hydraulic connector 400 and the component 401.

The manifold 202 may have two hydraulic line connections, including a hydraulic inlet connection 206 and hydraulic outlet connection 205, shown in FIG. 2B, from which both the hydraulic lock 403 and the pressure testing system 200 may be hydraulically powered. The hydraulic supply line 207 and the hydraulic outlet line 203 may be fluidly connected from an external hydraulic fluid supply system (not shown) to the manifold 202 via the hydraulic inlet connection 206 and the hydraulic outlet connection 205, respectively. The hydraulic supply line 207 and the hydraulic outlet line 203 may run through the manifold 202 to the hydraulic connector 400 to be fluidly connected with the hydraulic lock pistons 407.

The hydraulic supply line 207 and the hydraulic outlet line 203 may each be formed of one or more types of conduits fluidly connected together to form a flow path for the hydraulic fluid. For example, a hydraulic supply line may be formed of one or more types of tubing or hosing fluidly connected to a flow path machined through a component body. In the embodiment shown in FIGS. 2A-C, the hydraulic supply line 207 includes an exterior hose connected to tubing in the manifold via the hydraulic inlet connection 206 and branch hosing fluidly connected from the manifold to piston inlets 409 (shown in FIG. 2A and omitted in FIGS. 2B-C) for each of the pistons 407. The manifold may include internal porting in a manifold block or manifold housing that directs the flow between the components in the manifold, and hoses may be connected around the outside of the manifold to fluidly connect flow lines in the manifold to external components.

Figure 8:
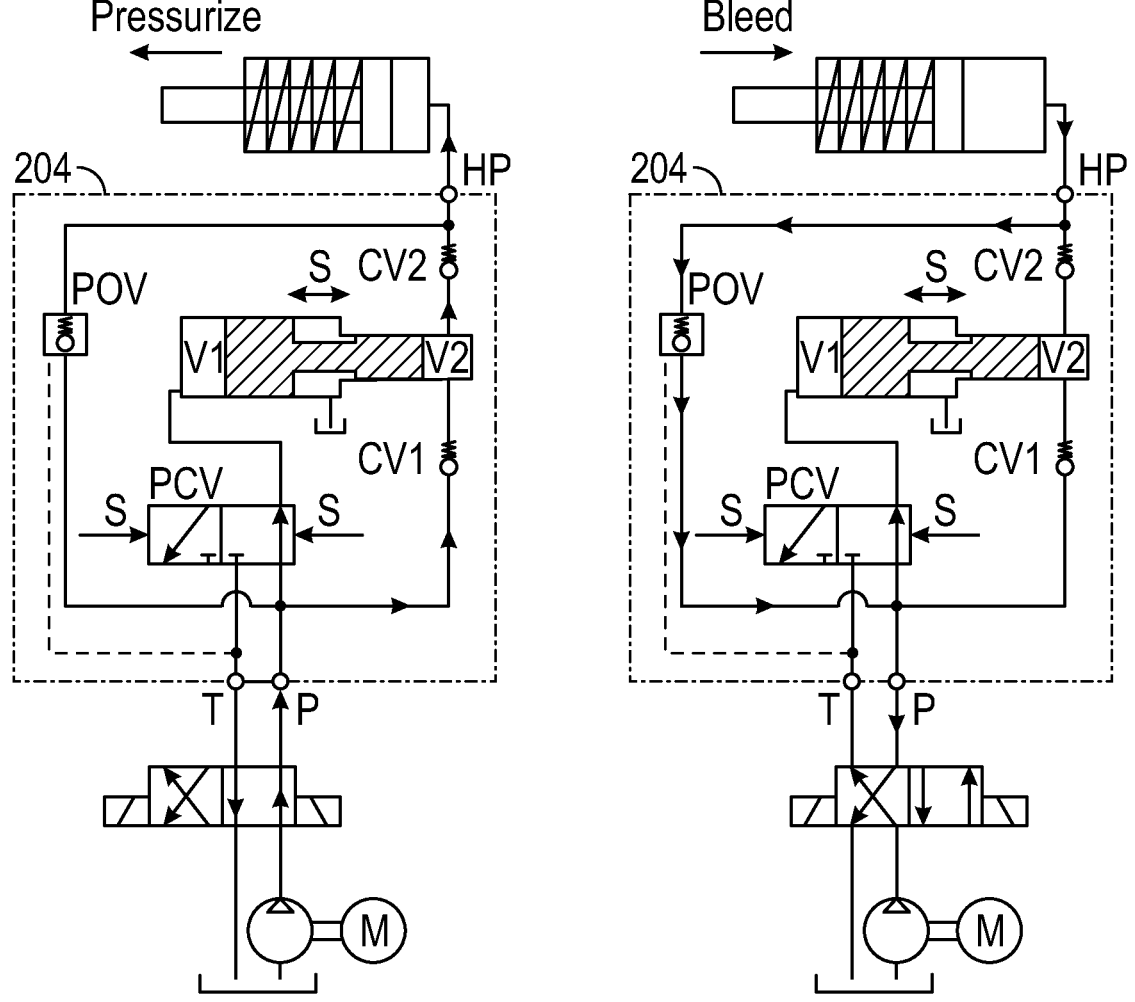
FIG. 8 shows a schematic diagram of a typical intensifier.

Hydraulic fluid may be redirected from the hydraulic supply line 207 to one or more valves and flow lines in the manifold 202, where the redirected hydraulic fluid may then be directed from the manifold 202 to the intensifier 204. In the intensifier 204, the hydraulic fluid is pressurized to a testing pressure to provide a pressurized testing hydraulic fluid. FIG. 8 shows a schematic of a typical intensifier that may be used to pressurize the redirected hydraulic fluid to provide a pressurized testing hydraulic fluid. As shown in FIG. 8, hydraulic fluid may be supplied through an intensifier test port (P port) of the intensifier 204 to a piston control valve (PCV) in the intensifier. The PCV may alternate positions to direct fluid to either side of a large head of a piston to provide a pumping action to the piston. Additionally, the fluid may be directed through a first check valve CV1 to a small head side of the piston. As the piston pumps, the fluid at the small head side of the piston may be pressurized in an amount proportional to the difference in volume at the large head side of the piston and at the small head side of the piston. For example, if the volume ratio of the volume at the large head side to volume at the small head side of the piston is 7:1, the intensifier piston may pressurize the hydraulic fluid up to 7 times. The pressurized fluid may then be directed through a second check valve CV2 to a high pressure (HP) connection. When bleeding the HP connection, the pressurized fluid may be directed through a pilot operated check valve (POV) to be bled (exited) through the P port of the intensifier. The POV is opened by directing fluid through a bleed port (T port) of the intensifier 204.

Pressurized testing hydraulic fluid from the intensifier 204 may then be directed to a test port on the hydraulic connector 400, where the test port may be in fluid communication with a connection surface between the hydraulic connector 400 and the component 401 being connected. In one or more embodiments, a test port flow path 210 may extend from the intensifier 204 to one or more seals 416 positioned at the connection between the connector 400 and connected component 401. In some embodiment, the test port flow path may be machined through the body of the hydraulic connector. The test port flow path 210 may be rated for pressures up to 15,000 psi, for example. Hydraulic fluid may be directed from the hydraulic inlet 206, through the manifold 202 and the intensifier 204 and into the test port flow path 210. Hydraulic fluid may be directed through the hydraulic supply line 207 and hydraulic inlet 206 at a first, hydraulic pressure. The intensifier 204 may substantially increase the pressure of the hydraulic fluid to a second, testing pressure. For example, in one or more embodiments, the intensifier 204 may increase the pressure of the hydraulic fluid such that the testing pressure is six times greater than the hydraulic pressure (e.g., seven times greater or ten times greater). The pressurized testing hydraulic fluid from the intensifier 204 may be directed through the test port flow path 210 at the testing pressure to pressure test the pressure rating of the connection between the hydraulic connector 400 and component 401.

By using pressure testing systems according to embodiments of the present disclosure, a hydraulic connector 400 may use only two hydraulic connections (a hydraulic inlet connection 206 and hydraulic outlet connection 205, shown in FIG. 2B) to an external hydraulic fluid supply system providing hydraulic fluid to and from the hydraulic connector system. For example, the hydraulic supply line 207 and the hydraulic outlet line 203 may be fluidly connected from the hydraulic inlet connection 206 and hydraulic outlet connection 205, respectively, to an external hydraulic fluid supply system including a valve control package and a hydraulic fluid supply. In contrast, conventional hydraulic connections may rely on at least three hydraulic connections to external hydraulic fluid supply systems, including hydraulic supply and outlet line connections and an additional high pressure hydraulic connection supplying high pressure hydraulic fluid to a pressure testing system.

According to embodiments of the present disclosure, a pressure testing system may be integrated with a hydraulic connector system, which may include a hydraulic connector utilizing at least one hydraulic lock, a hydraulic supply line and a hydraulic outlet line fluidly connected to the hydraulic lock, a test port in fluid communication with a connection surface of the hydraulic connector, an intensifier fluidly connected to the test port, a pressure transducer fluidly connected between the intensifier and the test port, and a manifold, wherein the manifold fluidly connects the intensifier to the hydraulic supply line and the hydraulic outlet line. By integrating a pressure testing system with a hydraulic connector system, hydraulic fluid used to operate the hydraulic connector may be used for pressure testing a connection to the hydraulic connector.

Figure 3:
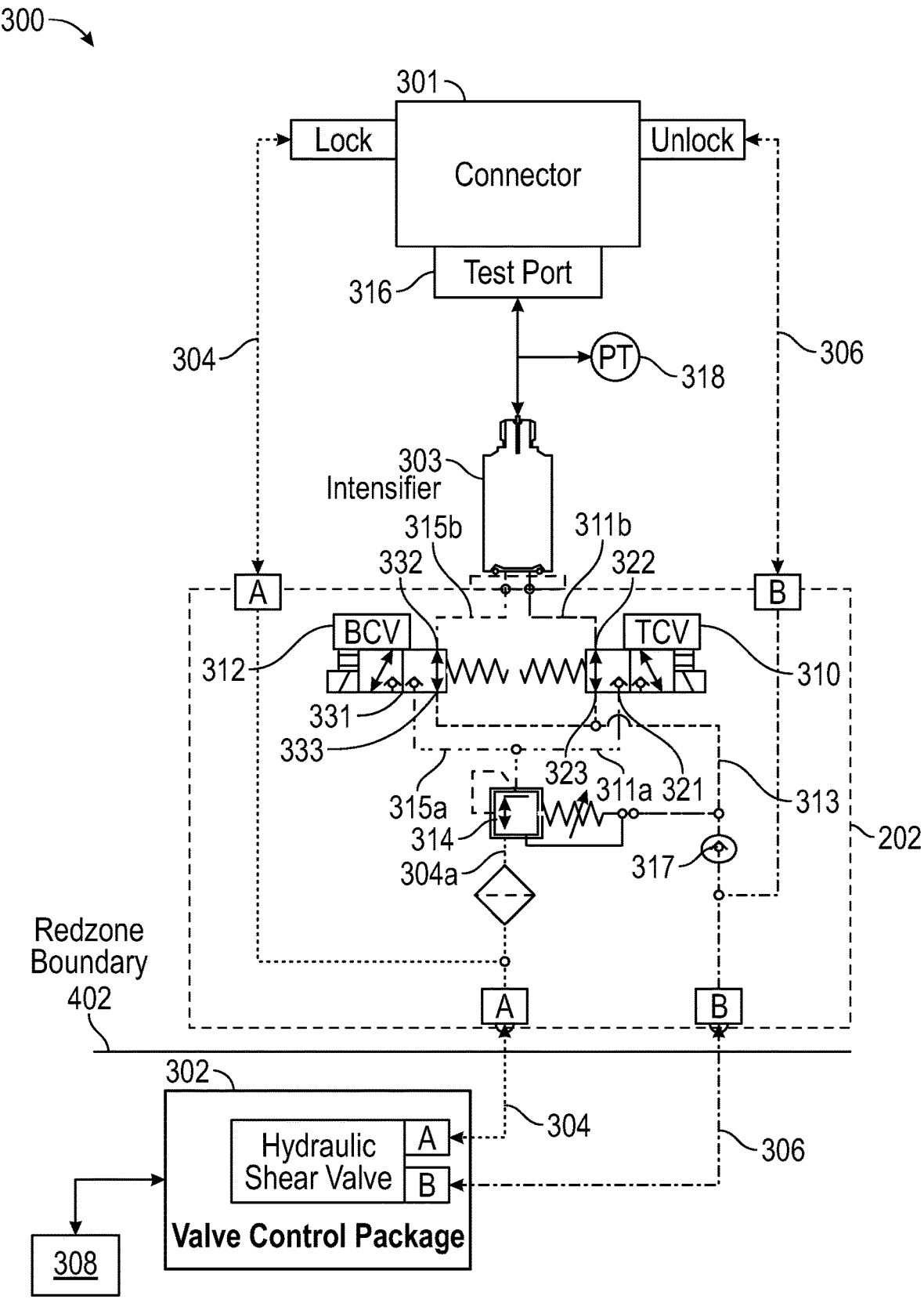
FIG. 3 shows a schematic of an automated testing system in accordance with one or more embodiments.

Turning now to FIG. 3, FIG. 3 shows a schematic of a pressure testing system 300 in accordance with one or more embodiments integrated with a hydraulic connector system. The hydraulic connector system includes a hydraulic connector 301 having at least one hydraulically activated component (e.g., a hydraulic lock) and a hydraulic supply line 304 and a hydraulic outlet line 306 in fluid communication with the hydraulically activated component of the hydraulic connector 301. Hydraulic fluid may be circulated through the hydraulic connector system via the hydraulic supply line 304 and the hydraulic outlet line 306 from an external hydraulic fluid supply system, which may include a hydraulic fluid source (not shown) and a valve control package 302. The valve control package 302 may include, for example, one or more of a shear valve, a directional control valve, a pressure control valve, and a flow control valve, which may be selected and assembled together to deliver hydraulic fluid from the hydraulic fluid source to the hydraulic connector at a selected hydraulic pressure. A master control unit 308 may be used to control the valves in the valve control package 302, and thus also control the hydraulic pressure of the hydraulic fluid in the hydraulic supply line 304 and hydraulic outlet line 306. As described in more detail below, a master control unit 308 may be a computer system (or part of a computer system), which may include software and controls to send signals to various components in the pressure testing system 300 and hydraulic connector system (e.g., to operate one or more valves and to receive and process sensor data).

The pressure testing system 300 may include an intensifier 303, which may be fluidly connected to a test port 316 on the connector 301 via a test line, a pressure transducer 318 fluidly connected to the test line, a test supply line 311a, 311b (collectively referred to as 311) fluidly connecting the hydraulic supply line 304 to an intensifier test port of the intensifier 303, a test control valve (TCV) 310 positioned along the test supply line 311 and operable to control fluid flow from the hydraulic supply line 304 to the intensifier 303. Particularly, an inlet portion of the test supply line 311a is connected to an inlet port 321 of the TCV 310, and an outlet portion of the test supply line 311b is connected to an outlet port 322 of the TCV 310.

The pressure testing system 300 may also include a bleed supply line 315a, 315b (collectively referred to as 315)

fluidly connecting the hydraulic supply line 304 to a bleed port of the intensifier 303, a bleed control valve (BCV) 312 positioned along the bleed supply line 315, a bleed outlet line 313 fluidly connecting the TCV 310 (and optionally the BCV 312) to the hydraulic outlet line 306, and a one way valve 317 positioned along the bleed outlet line 313. Particularly, an inlet portion of the bleed supply line 315a is connected to an inlet port 331 of the BCV 312, and an outlet portion of the bleed supply line 315b is connected to an outlet port 332 of the BCV 312. Bleed ports 323, 333 of the TCV 310 and BCV 312 are connected to the bleed outlet line 313. The pressure testing system 300 may also include a pressure regulator 314 fluidly connected to both the TCV 310 and the BCV 312 via test supply line 311 and the bleed supply line 315, respectively. A branch hydraulic supply line 304a may fluidly connect the main hydraulic supply line 304 to the pressure regulator 314, the test supply line 311 and the bleed supply line 315.

The TCV 310 and BCV 312 may each be a 3-way, 2-position poppet valve. When the poppet valve is not energized, the inlet port to the valve is blocked, and the outlet port and bleed port are in communication with each other. When the poppet valve is energized, the poppet valve shifts to the left directing flow from the inlet port to the outlet port and to the intensifier 303. Once power is removed, the poppet valve springs back to the non-energized position.

One or more elements of the pressure testing system 300 may be provided in a manifold 202. The manifold may include a compactly arranged set of components and flow-lines, which may be held together in a frame or housing. In the embodiment shown, the manifold 202 contains the TCV 310, the test supply line 311, the BCV 312, the bleed supply line 315, the bleed outlet line 313, the pressure regulator 314, and the one way valve 317. In one or more embodiments, the manifold 202 also contains a portion of the hydraulic supply line 304 and a portion of the hydraulic outlet line 306.

The intensifier 303 may be a fluid circuit, having two inlets and one outlet. One of the inlets (an intensifier test port) may be connected to the TCV 310 and the other inlet (a bleed port) may be connected to the BCV 312. As such, the intensifier 204 may be considered to have a "test" side and a "bleed" side. As a person of ordinary skill in the art will be aware, intensifiers, such as intensifier 303, may be based on a piston principle, where a piston having unequal fluid volumes on opposite sides may increase pressure by a factor equal to the ratio of the fluid volumes. As such, use of the intensifier 303 may allow for an increase in pressure from the two inlets to the outlet by a factor of the inlet pressure. For example, in one or more embodiments, the intensifier 303 may increase the pressure such that the outlet pressure is seven times the inlet pressure.

A test line may fluidly connect the intensifier outlet and the test port 316. The test port 316 may be fluidly connected to a connection surface of the hydraulic connector 301 (e.g., via a test port flow path 210 as shown in FIG. 2A). A pressure transducer 318 may be located along the test line between the intensifier 204 and the test port 316 to measure the pressure within the test line. In some embodiments, pressure measurements collected from the pressure transducer may be sent to the master control unit 308 (e.g., via wires or wirelessly) for monitoring the pressure in the test line during a pressure test.

In one or more embodiments, the manifold 202 and the intensifier 303 may be secured directly to the connector 301. In such embodiments, the pressure testing system 300 and the hydraulic connector 301 may be provided within a redzone boundary 402, and the external hydraulic fluid supply system may be provided outside the redzone boundary 402, as shown in FIG. 3. Because a high pressure testing fluid is not generated and directed to a hydraulic connector from a separate external fluid supply system, as done in conventional systems, the external hydraulic fluid supply system (including valve control package 302) may operate with relatively lower pressures to deliver hydraulic fluid to both the hydraulic connector system and pressure testing system at a relatively lower hydraulic pressure when compared with a testing pressure of pressurized fluid used in the pressure testing system.

Figure 4:
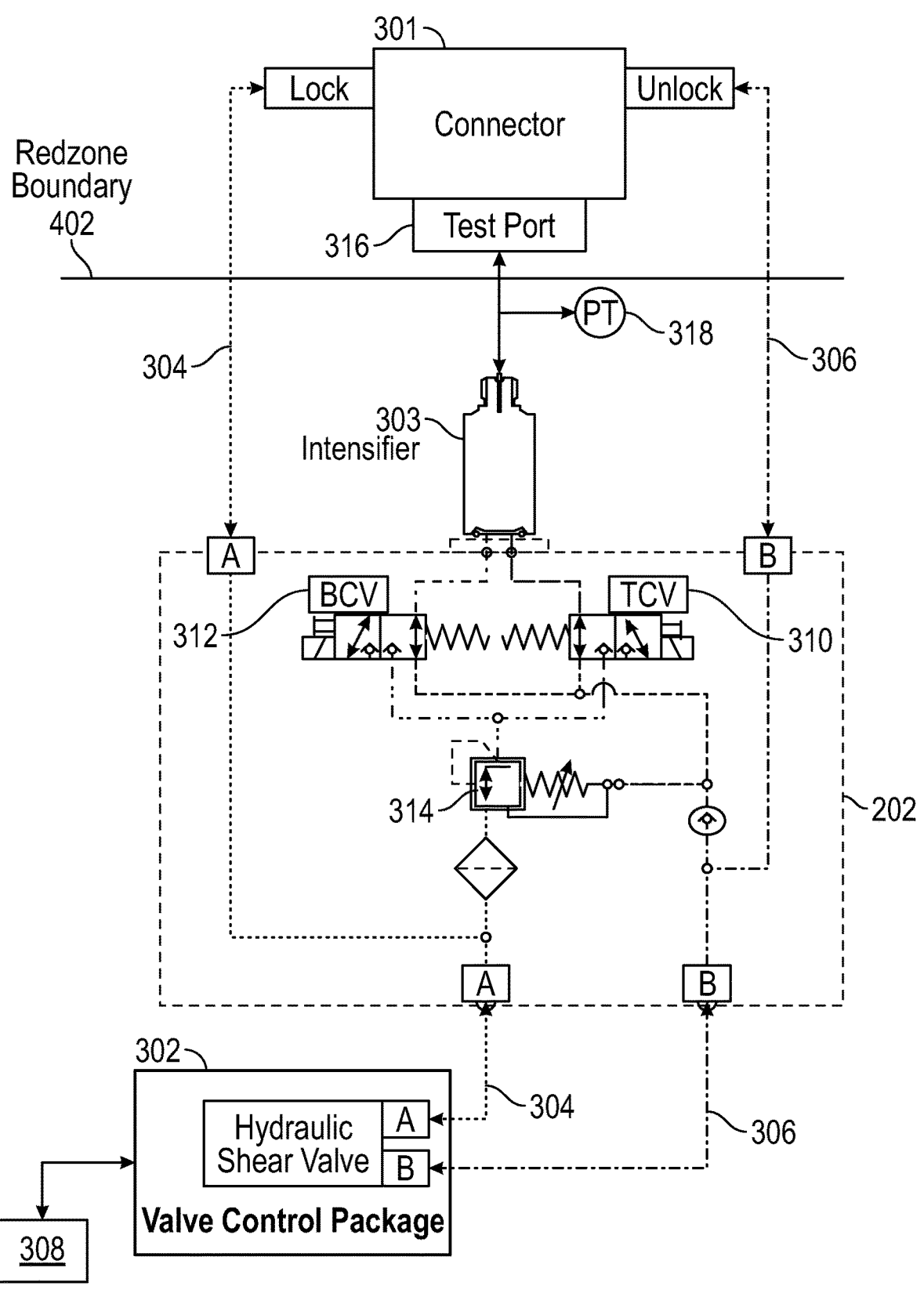
FIG. 4 shows a schematic of an automated testing system in accordance with one or more embodiments.
Figure 5:
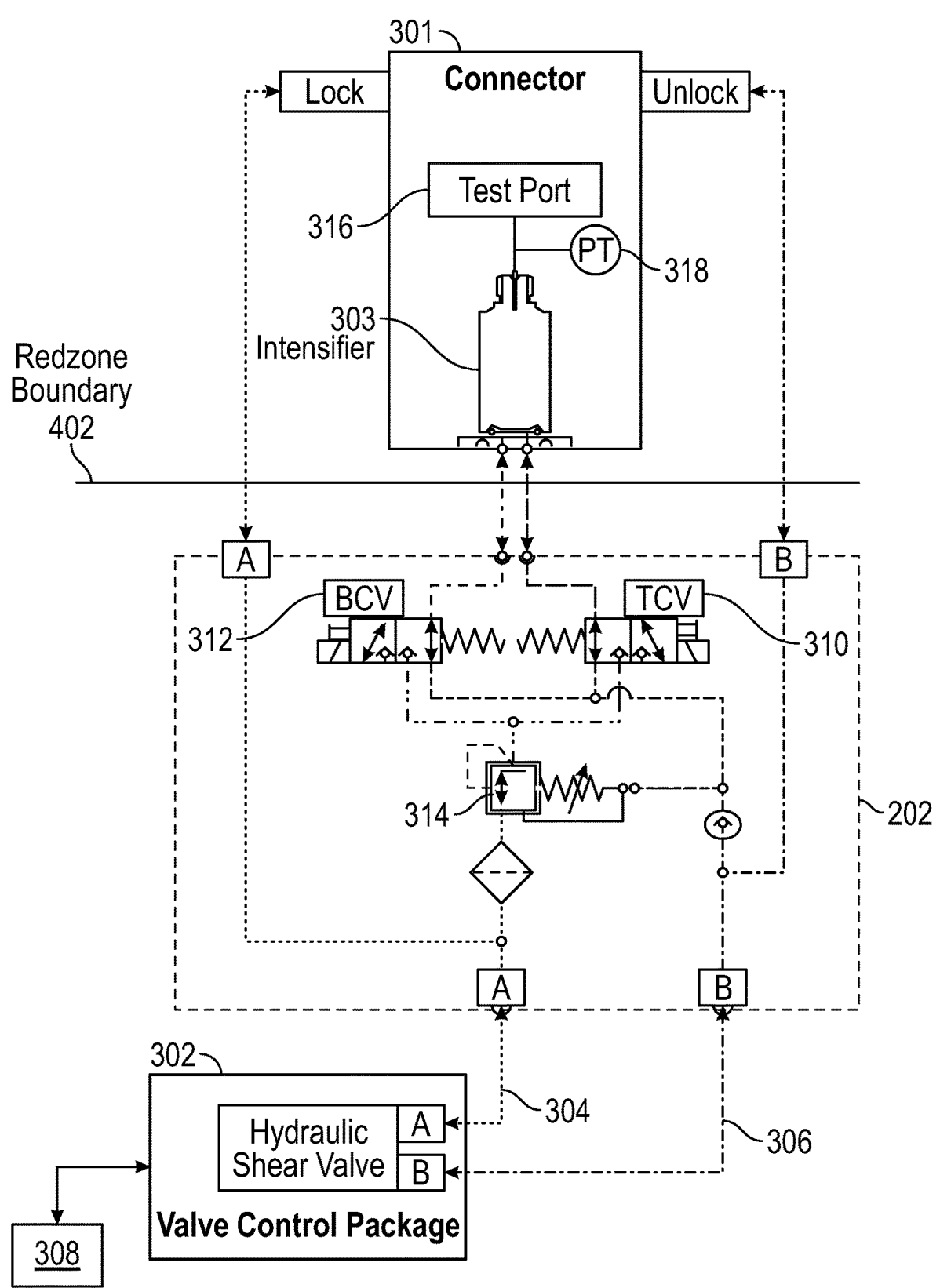
FIG. 5 shows a schematic of an automated testing system in accordance with one or more embodiments.

In some embodiments, such as shown in FIG. 4, the manifold 202 and the intensifier 303 may be located at a remote position outside of a redzone boundary 402. In other embodiments, such as shown in FIG. 5, the intensifier 303 may be secured directly to the hydraulic connector 301, while the manifold 202 may be located at a remote position outside of the redzone boundary 402. In such embodiments, the pressure testing system does not require high pressure fluid lines to be extended over the distance between the connector 301 and the redzone boundary 402. Rather, the intensifier 303 is coupled directly to the connector 301, removing the need for any extended high pressure fluid lines. In the embodiments shown in FIGS. 4 and 5, the pressure testing systems may be operated entirely automatically, e.g., using the master control unit 308, requiring no operators and no manual tools. For example, the master control unit may be in communication with at least the BCV 312, the TCV 310, and the valve control package 302 to control flow from a hydraulic fluid source to the hydraulic supply line 304. In contrast, conventional pressure testing systems require manual operation for the entire duration of the pressure test.

According to embodiments of the present disclosure, methods for pressure testing a connection to a hydraulic connector may include connecting the hydraulic connector to a component using a hydraulic supply line, and while the connection is maintained with the hydraulic supply line, pressure testing the connection between the hydraulic connector and the component. The pressure testing may include directing a portion of the hydraulic fluid from the hydraulic supply line to a pressure testing system, using an intensifier in the pressure testing system to pressurize the portion of hydraulic fluid to a testing pressure, and directing the pressurized portion of hydraulic fluid to the connection to test a pressure rating of the connection.

For example, FIG. 6 depicts a flowchart of a pressure testing method in accordance with one or more embodiments. More specifically, FIG. 6 depicts a flowchart 600 of a method for pressure testing a sealed connection between a hydraulic connector and a component. Further, one or more blocks in FIG. 6 may be performed by one or more components as described in FIGS. 2-5. While the various blocks in FIG. 6 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, a hydraulic fluid may be flowed through a hydraulic supply line at a hydraulic pressure to an inlet of a hydraulic lock on the hydraulic connector to actuate the hydraulic lock, S602. While the hydraulic pressure on the hydraulic lock is maintained, a testing portion of the hydraulic fluid from the hydraulic supply line is directed to a pressure testing system, S604. As described above, a pressure testing system may include an intensifier fluidly connected to a test port of the hydraulic connector and a TCV operable to control fluid flow from the hydraulic supply line to the intensifier. The method may further include actuating the TCV to direct the testing portion of hydraulic fluid to an intensifier test port, S606.

The intensifier may be used to pressurize the testing portion of hydraulic fluid at the hydraulic pressure to provide a pressurized testing hydraulic fluid having a testing pressure, S608. The pressurized testing hydraulic fluid may be directed from the intensifier through a test line to the test port of the hydraulic connector at the testing pressure, S610, wherein the test port is in fluid communication with a connection surface of the hydraulic connector along the sealed connection between the hydraulic connector and the component. The TCV may then be closed for a testing duration, S612, to prevent additional hydraulic fluid being sent through the intensifier during the testing duration.

During the testing duration, a pressure in the test line is measured (e.g., using pressure transducer 318 as shown in FIG. 3-5) as the pressurized testing hydraulic fluid is held in the test line. The pressure in the test line may be "held" at the intensifier end using one or more check valves within the intensifier, such as shown in the example intensifier of FIG. 8. If the pressure in the test line is maintained throughout the testing duration, the sealed connection may be considered as passing the pressure test. In such case, because the sealed connection is able to maintain its seal at the testing pressure, the sealed connection may be considered as having a pressure rating equal to the testing pressure. A decrease in the pressure in the test line during the pressure test may indicate there is a leak along the sealed connection, in which case, the sealed connection may be considered as failing the pressure test.

Pressure testing the connection between a hydraulic connector and the component being connected may be used to determine a safe pressure at which fluid may be flowed through the hydraulic connector and connected component. For example, referring back to FIGS. 2A-B, a main flow path 410 may be formed through the hydraulic connector 400 and connected component 401. The connection between the hydraulic connector 400 and component 401 may be pressure tested using pressure testing systems and methods disclosed herein in order to determine if the connection can hold a testing pressure of the pressure test. If the connection passes the pressure test, the testing pressure may be considered to be a safe pressure at which fluid may flow through the main flow path 410.

According to embodiments of the present disclosure, after a pressure test is concluded, the pressurized testing hydraulic fluid used in the pressure test may be bled out and reintroduced to the hydraulic connector system (e.g., to a hydraulic outlet line). For example, after a testing duration of a pressure test, a BCV in the pressure testing system may be actuated to direct a bleed portion of the hydraulic fluid from the hydraulic supply line, through a bleed supply line, to a bleed port of the intensifier, where the bleed portion of the hydraulic fluid in the intensifier may be used to actuate reverse flow of the pressurized testing hydraulic fluid from the intensifier through the TCV to a bleed outlet line. Thus, during the bleed process, the TCV may be in a non-energized position to allow fluid communication between the TCV outlet port and the TCV bleed port. The bleed outlet line may fluidly connect the TCV bleed port to the hydraulic outlet line of the hydraulic connector, such that hydraulic fluid exiting the intensifier may flow to the hydraulic outlet line. The pressurized testing hydraulic fluid may be bled from the intensifier until the pressure in the test line reaches zero. When the test line pressure reaches zero, the power to the BCV may be turned off.

Additionally, after a pressure test, the intensifier may be isolated from the hydraulic connector system using the BCV and the TCV, such that the hydraulic connector may be unlocked independent of the intensifier.

According to embodiments of the present disclosure, a master control unit may be used to perform one or more of the above-described steps in performing a pressure test and bleeding pressure testing fluid. For example, a master control unit may be in communication with the BCV and the TCV to control flow of hydraulic fluid through the pressure testing system. Additionally, the master control unit may be in communication with a valve control package to operate a valve controlling flow of the hydraulic fluid from a hydraulic fluid source to the hydraulic supply line. In some embodiments, the master control unit may be used to send signals to open, close, or otherwise operate one or more valves in the hydraulic connector system and pressure testing system according to one or more operational schedules. For example, an operational schedule may direct: when to activate/deactivate hydraulic components in the hydraulic connector; the hydraulic pressure to maintain to the hydraulic components when activated; and when to activate/deactivate the TCV and BCV valves in the pressure testing system.

Referring now to FIG. 7, FIG. 7 depicts a flowchart of another example of a pressure testing method in accordance with one or more embodiments. More specifically, FIG. 7 depicts a flowchart 700 of a method for pressure testing a sealed connection between a hydraulic connector and a fracturing tree. Further, one or more blocks in FIG. 7 may be performed by one or more components as described herein, which may be referred to referencing the examples shown in FIGS. 2-5. While the various blocks in FIG. 7 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, a hydraulic connector 400 may be provided, where the hydraulic connector 400 is secured to a fracturing tree, S702. The hydraulic connector 400 may be any hydraulically actuated connector, such as a wireline connector or a remotely hydraulically actuated connector for frac pumps. A pressure testing system 200 may be fluidly connected to one or more seals 416 provided in the hydraulic connector, S704. In one or more embodiments, the pressure testing system 200 may include a manifold 202 and an intensifier 204. The manifold 202 and the intensifier 204 may be secured directly to the hydraulic connector 400 in accordance with one or more embodiments. In other embodiments, the manifold 202 and the intensifier 204 may be positioned outside of a redzone boundary 402. In yet other embodiments, the intensifier 204 may be secured directly to the hydraulic connector 400 and the manifold 202 may be positioned outside of the redzone boundary 402.

The hydraulic connector 400 may be actuated into a locked position using a hydraulic supply line 304 (which may be referred to as a lock line) routed from a valve control package 302 to the hydraulic connector 400, S706. The valve control package 302 may include a hydraulic shear valve. Further, the pressure testing system 200 may be controlled by a computer system connected to the valve control package 302. In one or more embodiments, the hydraulic supply line 304 may pass through and be integrated with the manifold 202. Further, the valve control package 302 may maintain pressure on a lock port of the hydraulic connector 400, such that the hydraulic connector will remain locked throughout the duration of the pressure test.

Hydraulically powering the hydraulic supply line 304 may be used to energize the intensifier 204, S708. To energize the intensifier using the hydraulic supply line, a TCV 310 within the manifold 202 may be actuated, S710. Fluid may then flow from a first port of the valve control package 302, up the hydraulic supply line 304 through the TCV 310 and into the intensifier 204, S712. The intensifier 204 may increase the pressure of the fluid from a first pressure (e.g., the hydraulic pressure of the fluid flowing through the hydraulic supply line) to a second pressure, S714, which may be a testing pressure used for testing the connection of the hydraulic connector. For example, in one or more embodiments, the intensifier 204 may produce a second pressure that is seven times greater than the first pressure. In one example, the first pressure may be 2,000 psi and the second pressure may be 14,000 psi.

Fluid may then flow into a test port 316 on the hydraulic connector, which may be in fluid communication with the sealed connection of the hydraulic connector, where the fluid may fill a cavity of the test port 316, S716. The pressure within the test port 316 may then increase until a test pressure is reached within the cavity, S718. In one or more embodiments, for example, the test pressure may be 15,000 psi. Once the test pressure has been reached, a pressure transducer 318, which may be fluidly connected to the test port 316, may be used to validate the test pressure, S720.

Once the test pressure has been successfully validated, a power source connected to the TCV 310 may be turned off, S722. In one or more embodiments, the test pressure may be locked into the test port 316 and maintained for a desired period of time, S724. The desired period of time may refer to the testing duration. An example testing duration may range from 3 to 5 minutes.

A pressure test may be performed on sealed connection of the hydraulic connector, e.g., on one or more seals 416 positioned within the connector 400, S726. The pressure test, in accordance with one or more embodiments, may involve maintaining the test pressure within the cavity of test port 316 without any leakage from the one or more seals 416. In some embodiments, a pressure test may have a preselected limit for a drop in pressure over a testing duration, where if the preselected limit is met, the connection passes the pressure test, and if the preselected limit is passed, the connection fails the pressure test. For example, a pressure test may have a preselected limit where the pressure is not to exceed a 200 psi drop over a testing duration selected between 3 and 5 minutes.

Once the pressure test has been successfully completed, a BCV 112 in the pressure testing system may be actuated, S728. Actuating the BCV 312 may apply pressure to the bleed side of the intensifier 204, allowing pressure within the test port 316 to bleed through the TCV 310, S730. In other words, the bleed side of the intensifier 204 essentially overrides the internal valving of the intensifier 204, allowing pressure to bleed from the test port, through the intensifier 204, to the TCV 310. The TCV 310 may be in fluid communication with a hydraulic outlet line 306 (which may also be referred to as an unlock line). As such, bleeding through the TCV 310 may induce actuation of the hydraulic outlet line 306 (e.g., through a valve), where the hydraulic outlet line 306 is routed from the valve control package 302 to the hydraulic connector 400, S732. Actuation of the hydraulic outlet line 306 induces actuation of the hydraulic connector 400 into an unlocked position, S734.

In one or more embodiments, the method may further include achieving a zero pressure in the cavity of the test port 316. Once zero pressure has been achieved, a power source connected to the BCV 312 may be switched off. Together, the TCV 310 and the BCV 312 may then isolate the intensifier circuit. This may allow for locking or unlocking of the hydraulic connector 400 independent of the intensifier 204.

In one or more embodiments, the power source of the TCV 310 and the BCV 312 may be the fluid from the hydraulic supply line, which is already integrally formed into the hydraulic connector 400. As such, no additional hydraulic lines may be required beyond what would ordinarily be provided on the hydraulic connector 400.

Embodiments of the present disclosure may provide at least one of the following advantages. Conventional seal pressure testing systems require constant manual operation. As such, current systems are incredibly inefficient. Further, conventional pressure testing systems require high pressure fluid lines to extend from the connector to a separate high pressure fluid supply system, which may be located outside of the redzone boundary, increasing safety risks. Embodiments of the present disclosure may provide a fully automated system requiring no manual operation. Instead, the system is hydraulically operated, where operations may be controlled by a computer system. Further, embodiments of the present disclosure provide a pressure testing system which may be secured directly to a connector. In addition, embodiments of the present disclosure allow for testing by pressurizing only the volume within the test port, which is relatively small in comparison to the volume of fluid which would be pressurized within conventionally used high pressure fluid lines. A smaller pressurized volume improves safety and reduces risk.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system, comprising:
a hydraulic connector comprising a hydraulic lock;
a hydraulic supply line and a hydraulic outlet line fluidly connected to the hydraulic lock;
a test port in fluid communication with a connection surface of the hydraulic connector;
an intensifier fluidly connected to the test port;
a pressure transducer fluidly connected between the intensifier and the test port; and
a manifold, comprising:
a test supply line fluidly connecting the hydraulic supply line to a test port of the intensifier,
a test control valve positioned along the test supply line,
a bleed supply line fluidly connecting the hydraulic supply line to a bleed port of the intensifier,
a bleed control valve positioned along the bleed supply line,
a bleed outlet line fluidly connecting the test control valve to the hydraulic outlet line, and
a one way valve positioned along the bleed outlet line, and wherein the manifold fluidly connects the intensifier to the hydraulic supply line and the hydraulic outlet line.

2. The system of claim 1, wherein the bleed outlet line also fluidly connects the bleed control valve to the hydraulic outlet line.

3. The system of claim 1, further comprising:

a master control unit, wherein the master control unit is in communication with the bleed control valve and the test control valve; and a valve operable to control flow from a hydraulic fluid source to the hydraulic supply line, wherein the master control unit is in communication with the valve.

4. The system of claim 1, a valve control package comprising at least one valve fluidly connected to the hydraulic supply line and the hydraulic outlet line.

5. The system of claim 1, wherein the hydraulic connector is hydraulically locked onto a fracturing tree.

6. The system of claim 1, wherein the intensifier and the manifold are coupled to the hydraulic connector.

7. The system of claim 1, wherein the intensifier and the manifold are positioned a distance away from the hydraulic connector, outside of a redzone boundary.

8. The system of claim 1, wherein the intensifier is coupled to the hydraulic connector and the manifold is positioned a distance away from the hydraulic connector, outside of a redzone boundary.

9. The system of claim 1, further comprising one or more seals positioned around the connection surface.

10. The system of claim 1, wherein the test port is in fluid communication with the connection surface via a test port flow path formed through the hydraulic connector.

* * * * *